United States Patent [19]

Isono et al.

[11] Patent Number: 4,531,755
[45] Date of Patent: Jul. 30, 1985

[54] SUSPENSION SYSTEM FOR A FRONT ROAD WHEEL OF A MOTORCYCLE

[75] Inventors: Tokio Isono, Tokyo; Kazuhiko Tsunoda, Saitama, both of Japan

[73] Assignee: Honda Giken Kogyo Kabushiki Kaisha, Tokyo, Japan

[21] Appl. No.: 309,018

[22] Filed: Oct. 6, 1981

[30] Foreign Application Priority Data

Oct. 9, 1980 [JP] Japan .................. 55-141801

[51] Int. Cl.³ .................. B62K 19/10; B62K 21/02
[52] U.S. Cl. .................. 280/277; 280/276; 280/279
[58] Field of Search .................. 280/274–287; 180/208, 219; 296/27

[56] References Cited

U.S. PATENT DOCUMENTS

| | | | |
|---|---|---|---|
| 1,264,643 | 4/1918 | Harley | 280/277 |
| 1,370,564 | 3/1921 | Starley | 280/279 |
| 4,212,481 | 7/1980 | Ribi | 280/279 X |
| 4,406,475 | 9/1983 | Miyakoshi et al. | 280/277 |
| 4,421,338 | 12/1983 | Isono et al. | 280/279 |

FOREIGN PATENT DOCUMENTS

| | | | |
|---|---|---|---|
| 547788 | 3/1932 | Fed. Rep. of Germany | 280/277 |
| 579278 | 6/1933 | Fed. Rep. of Germany | 280/279 |
| 900712 | 10/1944 | France | 280/281 R |
| 2418742 | 9/1979 | France | 280/277 |
| 118930 | 9/1918 | United Kingdom | 280/279 |
| 123396 | 2/1919 | United Kingdom | 280/276 |
| 125555 | 4/1919 | United Kingdom | 280/276 |
| 302788 | 12/1928 | United Kingdom | 280/279 |
| 1540824 | 2/1979 | United Kingdom | 280/277 |

Primary Examiner—Joseph F. Peters, Jr.
Assistant Examiner—Mitchell J. Hill
Attorney, Agent, or Firm—Irving M. Weiner; Pamela S. Burt

[57] ABSTRACT

A link motion type suspension system for a front road wheel of a motorcycle which includes an upper fork supported on a body frame, a lower fork supporting the front road wheel thereon, and a shock absorber connected for operation between the upper and lower forks through links. In order to minimize the weight of the forks, component parts of at least one of the upper fork and the lower fork of the suspension system is hollow.

5 Claims, 15 Drawing Figures

SUSPENSION SYSTEM FOR A FRONT ROAD WHEEL OF A MOTORCYCLE

BACKGROUND OF THE INVENTION

1. Field of the Invention

The present invention relates to a suspension system for a front road wheel of a motorcycle, and more particularly to a suspension system for a front road wheel of a motorcycle of the type which employs a link motion therein.

2. Related Art

In a suspension system for a front road wheel of a motorcycle, it is known to employ a telescopic type front fork for suspending the front wheel including fork pipes and slidable bottom cases which constitute hydraulic shock absorbers. Another type of suspension system which employs a link motion therein is also known, for example, from U.S. Pat. No. 4,212,481, granted to Valentino Ribi on July 15, 1980.

This link motion type suspension system includes an upper fork supported on a body frame, a lower fork supporting a front road wheel thereon, and a shock absorber having one end thereof joined to either one of the two forks and the other end thereof operatively connected to the other one of the two forks through links. The suspension system of this type is advantageous in that the performance of the front road wheel in following irregularities on a road can be improved because a greater stroke of movement can be attained with the front road wheel than with that in the telescopic type suspension system, and because the size and weight of the shock absorber can be reduced since the amount of expansion of the shock absorber can be made smaller in contrast to such a greater stroke. The link motion type suspension system, however, requires a relatively large number of paired links in addition to the upper fork and the lower fork. Further, because the shock absorber is not housed or built in the suspension system, the shock absorber is required to have mounting means provided at opposite ends thereof. Accordingly, the link motion type suspension system is disadvantageous in that it is likely to have a greater total weight when compared with conventional suspension systems of the telescopic type.

SUMMARY OF THE INVENTION

The present invention provides a link motion type suspension system for a front road wheel of a motorcycle. The system includes an upper fork supported on a body of the motorcycle, a lower fork supporting the front road wheel thereon, and a shock absorber having one end thereof joined to either one of the two forks and the other end thereof connected to the other one of the two forks through links. Components of at least one of the upper fork and the lower fork are made hollow.

Accordingly, it is an object of the present invention to provide a link motion type suspension system for a front road wheel of a motorcycle which system is assembled with fork members which can be produced easily, have a great strength and rigidity, and are light in weight.

It is another object of the invention to provide a link motion type suspension system for a front road wheel of a motorcycle wherein fork members of the system are reduced in weight so that the moment of inertia around an axis of turning operations of a handlebar can be reduced and hence a light handling of the handlebar can be attained.

It is a further object of the invention to provide a link motion type suspension system for a front road wheel of a motorcycle, which system includes a reduced number of component parts, results in reduced production costs, and provides improved assembling operations of component parts of the suspension system with the body frame of the motorcycle.

DETAILED DESCRIPTION OF THE INVENTION

Figure 1:
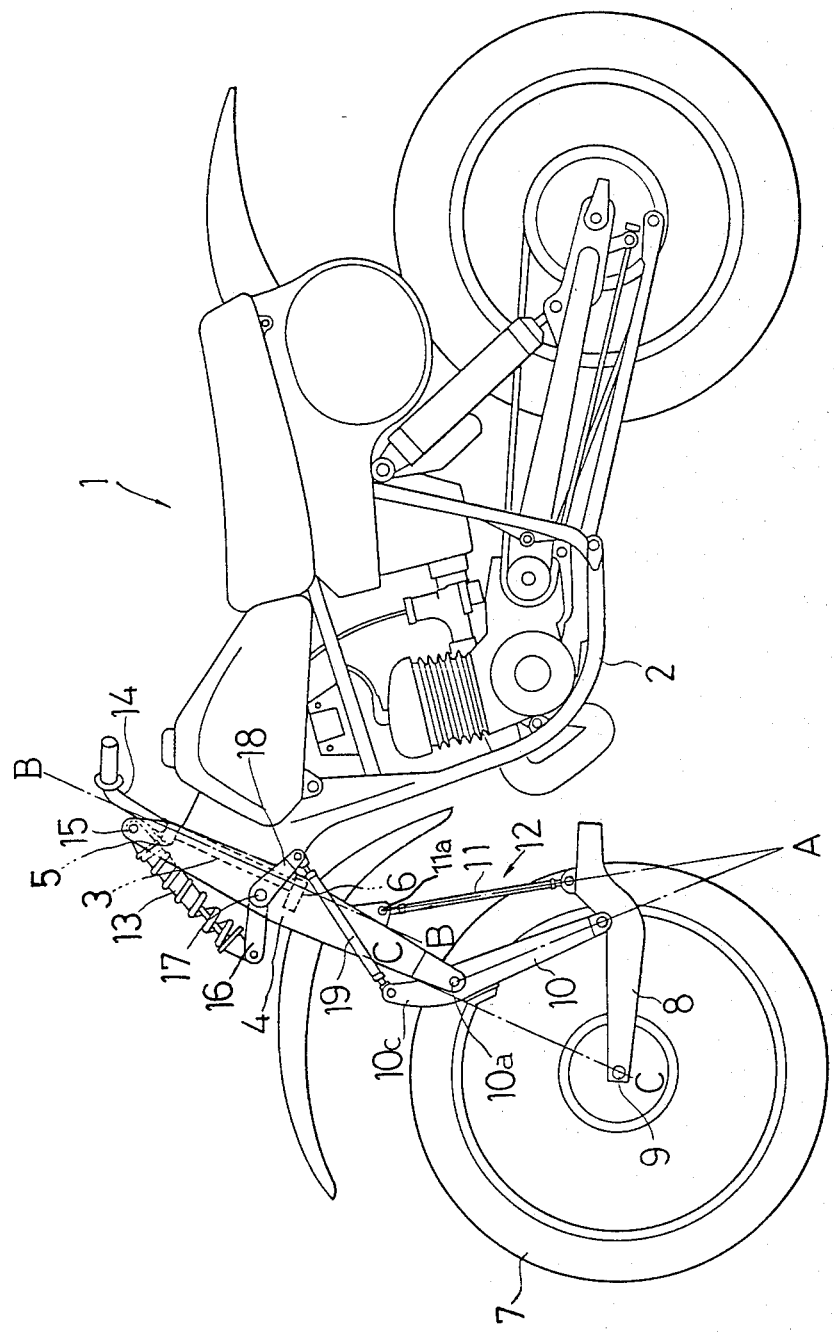
FIG. 1 is a general side elevational view of an exemplary motorcycle including a link motion type suspension system for a front road wheel, to which the present invention can be applied.
Figure 2:
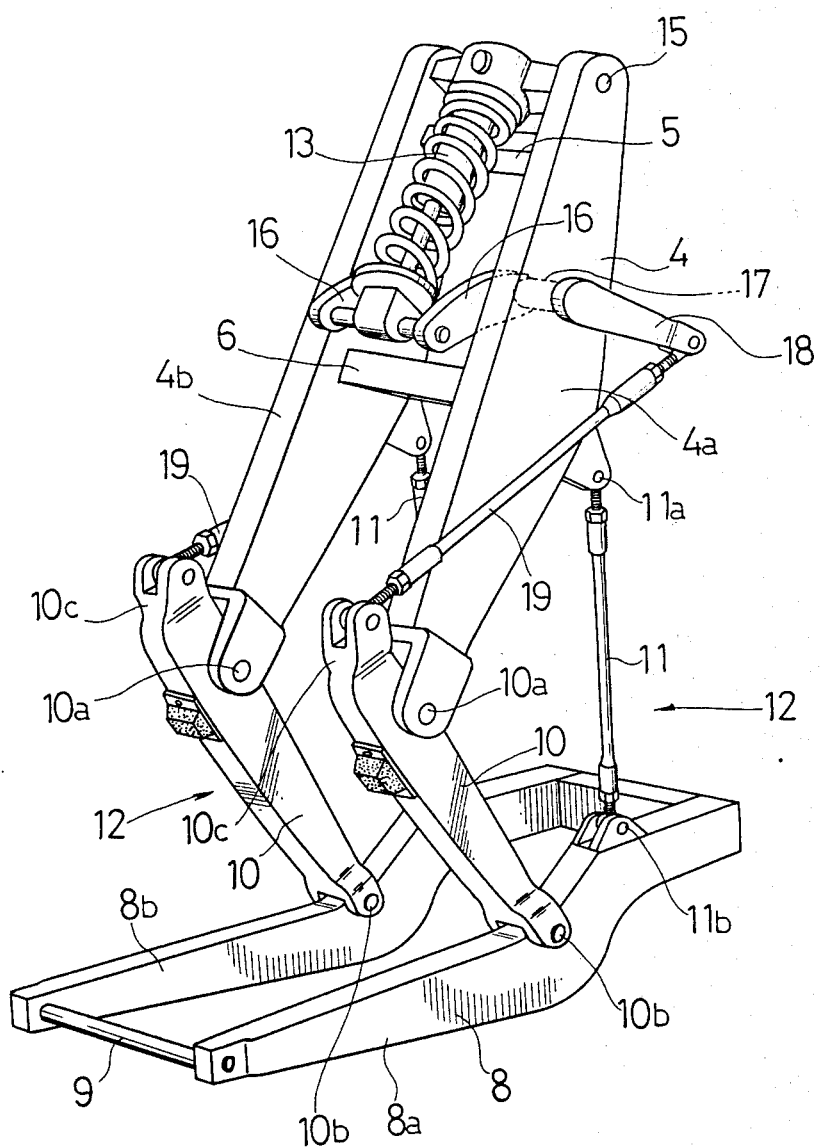
FIG. 2 is a perspective view of the suspension system shown in FIG. 1.

Referring first to FIG. 1, there is illustrated a motorcycle 1 which includes a link motion type suspension system for a front road wheel, to which the present invention can be applied. The suspension system includes an upper fork 4 supported for turning motion in a clockwise or counterclockwise direction on a body frame 2 of the motorcycle 1 by means of a top bridge 5 and a bottom bridge 6 which are both pivotally mounted on a portion of the body frame defined by a head tube 3 disposed on a forward end of the body frame 2, the top bridge 5 and bottom bridge 6 being provided at upper and intermediate portions of said upper fork, respectively. A front road wheel 7 is mounted for rotation on a lower fork 8 by means of a transverse axle 9 mounted at a forward end of the lower fork 8. The upper fork 4 and the lower fork 8 are interconnected by two front and rear arms 10 and 11 so as to form a quadrilateral link assembly 12 which thus includes the upper fork 4 as a stationary link, and the lower fork 8 and the arms 10 and 11 as movable links. As shown in FIG. 2, the upper and lower forks 4 and 8 include a pair of left and right side members 4a, 4b, and 8a, 8b, respectively, and a set of the two arms 10 and 11 are disposed between a set of the left side members 4a and 8a and between another set of the right side members 4b and 8b. Specifically, the left and right side members 4a, 4b of upper fork 4 are respectively connected at the lower ends thereof to the side members 8a, 8b of lower fork 8 via front arms 10 at pivots 10a, and also at substantially intermediate rear portions thereof via rear arms 11 at pivots 11a. Thus, the suspension system includes a pair of such quadrilateral link motion assemblies 12 disposed on left and right sides of the front road wheel 7, both link motion assemblies 12 having the same configuration and being deformable in a similar manner.

A shock absorber 13 for damping upward and downward movements of the front road wheel 7 is disposed on an upper part of the upper fork 4 in front of a handlebar 14. The shock absorber 13 is mounted at a top end thereof for rocking motion in a forward or rearward direction on and around a pivot 15 mounted on the upper ends of the left and right side members 4a and 4b of the upper fork 4. First oscillatory arms 16 are connected at free ends thereof to a bottom end of the shock absorber 13. The base ends of the first oscillatory arms 16 are connected to the base ends of second oscillatory arms 18 through pivots 17 which extend transversely through the upper fork 4 at substantially intermediate portions thereof. Rear ends of the second oscillatory arms 18 are connected through pull rods 19 to end portions 10c of the arms 10 extending upwardly over the fulcra thereof provided by pivots 10a on which the arms 10 are pivotally mounted.

Operations of the suspension system of the link motion type will now be described with reference to FIG. 1. When the front road wheel 7 is moved upwardly due to an uneven road surface, each quadrilateral link motion assembly 12 is deformed such that the lower fork 8 is turned around an instantaneous center which is the point of intersection A of extension lines of longitudinal axes of the two arms 10, 11 which are inclined so as to converge rearwardly and downwardly, and such that the axle 9 of the front road wheel 7 is raised along a substantially rectilinear trajectory C—C which is substantially parallel to an axis B—B around which the handlebar 14 is operated to turn. Upon deformation of the link motion assemblies 12, a tensile force is applied to the rod 19 so that both the first and second oscillatory arms 16 and 18 are rocked in the clockwise direction as viewed in FIG. 1 and hence the shock absorber 13 is compressed to provide a damping force against the upward movement of the front road wheel 7.

Figure 3:
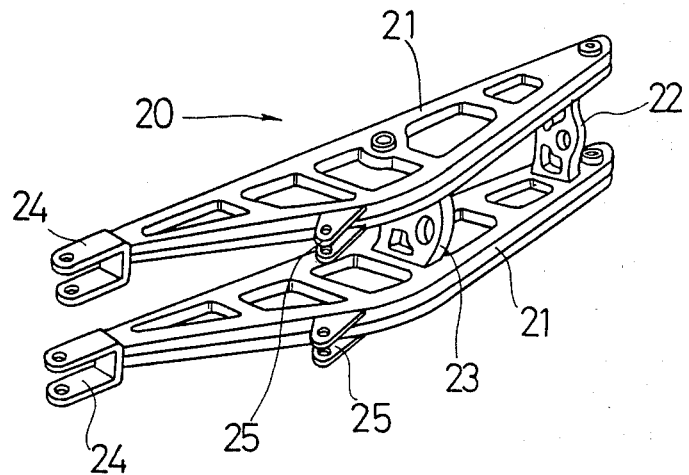
FIG. 3 is a perspective view of an embodiment of an upper fork constituting part of a suspension system for a front road wheel in accordance with the present invention.
Figure 4:
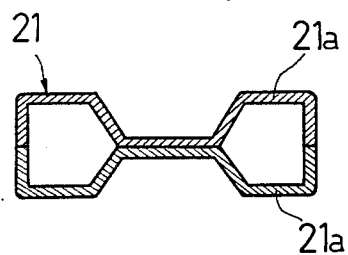
FIGS. 4, 5, 6 and 7 are cross sectional views of various side members for use with the upper fork, which may be employed in the embodiment of FIG. 3.
Figure 5:
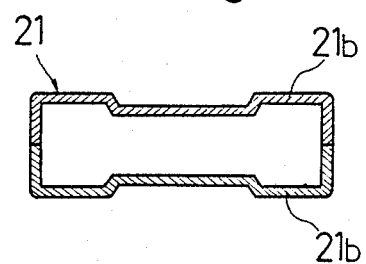
Figure 6:
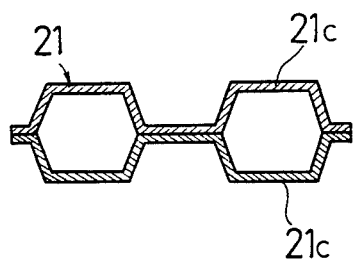
Figure 7:
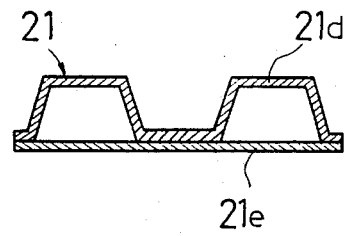

FIG. 3 shows an exemplary upper fork 20 which is mounted for turning motion in the right or left direction on the body frame of a motorcycle by operation of the handlebar thereof. The upper fork 20 includes a pair of side members 21 of the same configuration which are connected to each other by means of a top bridge 22 and a bottom bridge 23. Brackets 24 and 25 for pivotally mounting the aforementioned two front and rear arms thereon are fixed respectively to the lower end and to a lower rear portion of each side member 21 by soldering or the like. Thus, both the top and bottom bridges 22 and 23 are integrated with the upper fork 20, thereby reducing the number of component parts and operations for assembling the upper fork to the head tube of the body frame. Each side member 21 is hollow and is produced by joining a pair of symmetrically shaped pressed plates 21a, which are produced by stamping a steel plate material, together as a unit by soldering or the like as shown in FIG. 4. The cross-sectional shape shown in the pressed plate, however, is not limited to that of FIG. 4, and may alternatively be that of a pressed plate 21b or 21c as shown in FIGS. 5 and 6. Further as shown in FIG. 7, the side member 21 may be produced with a shaped pressed plate 21d and a flat plate 21e which are joined together as a unit.

It will be understood that production of a side member 21 by joining a plurality of plate members together as a unit in a manner as described above facilitates production, reduces production costs, improves strength and rigidity, and so on, of the upper fork 20 which includes the side members 21 as component parts thereof. Further, because the side members 21 are hollow, the weight of the upper fork 20 is reduced, and hence the moment of inertia of the handlebar around its axis of turning operation is reduced correspondingly to such reduction of the weight. Accordingly, performance of the handlebar for turning operations is improved, and such effect is highly superior when the upper fork is applied to a racing motorcycle.

Figure 8:
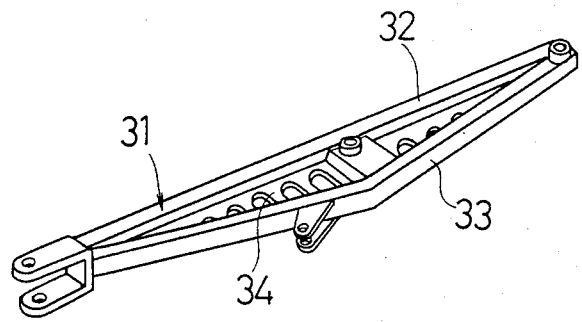
FIG. 8 is a perspective view of a side member constituting another embodiment of an upper fork.
Figure 9:
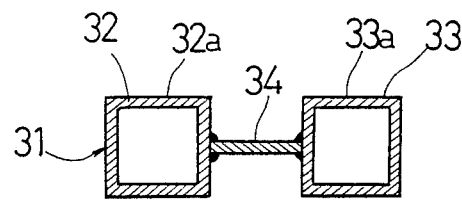
FIGS. 9, 10, 11 and 12 are cross sectional views of various side members for the upper fork, which may be employed in the embodiment of FIG. 8.
Figure 10:
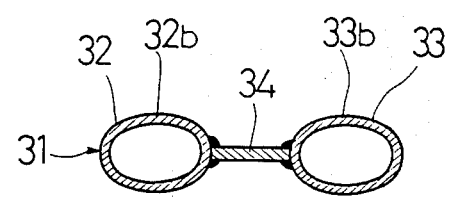
Figure 11:
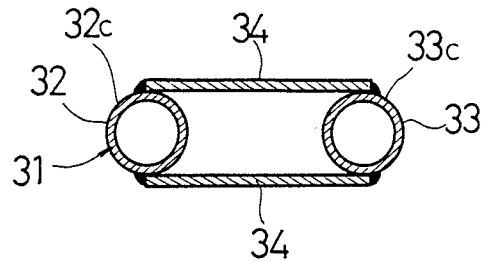
Figure 12:
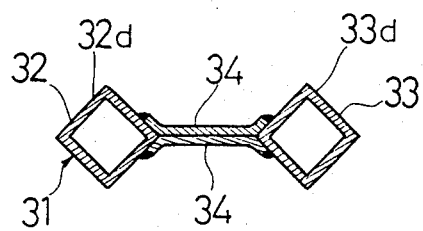

FIG. 8 shows a side member 31 for use with another embodiment of an upper fork in accordance with the invention. In this embodiment, the side member 31 includes front and rear outer frame members 32 and 33 cooperatively defining an outer frame configuration thereof which is substantially in the form of an isosceles triangle (such that the width thereof in the longitudinal direction of the motorcycle is greatest at its center), and a separate flat plate member 34 secured to and between the outer frame members 32 and 33 by soldering or the like. The outer frame members 32 and 33 are hollow and may have any one of the cross-sectional shapes illustrated in FIGS. 9 to 12. In particular, the outer frame members 32a, 33a and 32d, 33d of FIGS. 9 and 12, respectively, are each shown to have a square cross-sectional shape; the outer frame members 32b, 33b of FIG. 10 are elliptic in cross section; and the outer frame members 32c, 33c of FIG. 11 are circular in cross section. The side member of FIG. 11 includes two flat plate members 34 fixed to outer surfaces of both outer frame members 32c and 33c in a spaced relationship to each other. The side member 31 of FIG. 12 also includes two flat plate members 34 which are fixed one on the other to the opposed corners of both outer frame members 32d and 33d.

Figure 13:
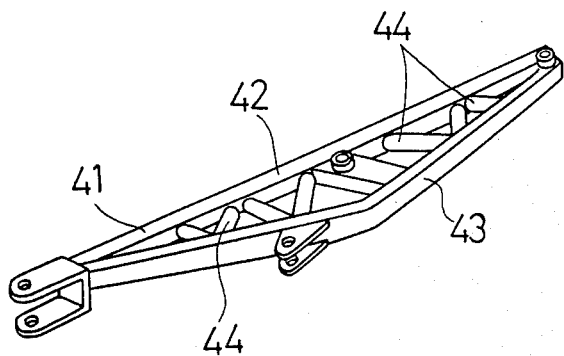
FIG. 13 is a perspective view of a side member constituting a further embodiment of an upper fork.
Figure 14:
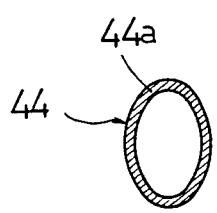
FIGS. 14 and 15 are cross sectional views of side members for the upper fork, which may be employed in the embodiment of FIG. 13.
Figure 15:
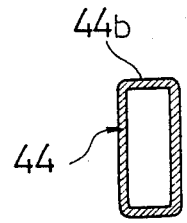

FIG. 13 shows a side member 41 for use with a further embodiment of an upper fork in accordance with the invention. In this embodiment, the side member 41 includes front and rear outer frame members 42 and 43 similar to the frame members 32 and 33 of FIG. 8, respectively, and a plurality of connecting members 44 disposed between both outer frame members 42 and 43 to connect them to each other in a truss-type structure. The outer frame members 42, 43 may be hollow or alternatively may be solid. FIGS. 14 and 15 show cross sectional views of connecting members 44 having different cross-sectional shapes, respectively. Both of the connecting members 44a, 44b are hollow. The connecting member 44a of FIG. 14 is elliptic in cross section while the connecting member 44b of FIG. 15 has a rectangular cross section. The cross sections of both connecting members 44a, 44b have a greater ratio of the major to minor axis dimension than those of the preceding embodiments.

If the connecting members 44a or 44b are connected to the outer frame members 42 and 43 with the major axes of their cross sections being directed coincident with the direction of the body of the motorcycle, the moment of inertia of the upper fork can be effectively reduced thereby. Also, if the outer frame members 42, 43 themselves are each formed of a pipe having a cross-sectional shape as shown in FIG. 14 or in FIG. 15, the moment of inertia can be further reduced and the width-wise dimension of the upper fork can also be reduced.

Although the invention has been described as applied to an upper fork of a motorcycle, it can also be applied in a similar manner to a lower fork such that component parts are hollow in accordance with the present invention.

As has been made clear from the foregoing description, the present invention facilitates production of an upper fork and a lower fork comprising a link motion assembly for use with a suspension system for a front road wheel of a motorcycle, reduces the number of component parts, and simplifies assembling operations as well as reducing the weight of the motorcycle, with a resultant reduction of the moment of inertia, and at the same time significantly reduces production costs of the motorcycle. Thus, the present invention provides a greatly improved suspension system for a front road wheel of a motorcycle.

We claim:

1. A link motion type suspension system for a front road wheel of a motorcycle, comprising:
    an upper fork supported on a body frame of said motorcycle;
    said upper fork comprising hollow component parts;
    said upper fork including a pair of side members (31, 31) each comprising:
        a pair of hollow outer frame members (32, 33) made of tubular materials, and a connecting member (34) for connecting said pair of outer frame members to each other, said connecting member being made of a material which is separate from said tubular material such that said connecting member defines a separate further component part of said upper fork;
        said outer frame members of each of said upper fork side members together defining substantially an isosceles triangle configuration, such that the width thereof in the longitudinal direction of said motorcycle is greatest at the center of each said upper fork side member;
    a lower fork supporting said front road wheel thereon;
    a shock absorber having one end thereof operatively connected between upper ends of said pair of upper fork side members, and the other end thereof operatively supported at substantially intermediate front portions of said pair of upper fork side members via a pair of oscillatory arms which are connected with said lower fork;
    links connecting said oscillatory arms with said lower fork;
    said pair of side members of said upper fork being respectively connected at lower ends thereof to a pair of lower fork side members via a pair of front arms, and at substantially intermediate rear portions thereof via a pair of rear arms;
    each of said upper fork side members being connected to a portion of said body frame at upper and intermediate portions of said side members.

2. A suspension system according to claim 1, wherein:
    said connecting member comprises at least one flat plate member for connecting said pair of outer frame members to each other.

3. A suspension system according to claim 1, wherein:
    a plurality of said connecting members are provided for connecting said pair of outer frame members to each other, said plurality of connecting members comprising hollow connecting members.

4. A link motion type suspension system for a front road wheel of a motorcycle, comprising:
    an upper fork supported on a body frame of said motorcycle;
    a lower fork supporting said front road wheel thereon;
    a shock absorber having one end thereof joined to said upper fork and the other end thereof operatively connected to said lower fork;
    links connecting said other end of said shock absorber to said lower fork; and
    a plurality of component parts of at least one of said upper fork and said lower fork being hollow, wherein:
    said at least one fork comprising said hollow component parts further includes a pair of side members each including a pair of solid frame members made of bar material; and
    said hollow fork component parts comprise a plurality of separate hollow connecting members for connecting said pair of outer frame members to each other, said connecting members being made of a material which is separate from said bar material of said solid frame members.

5. A suspension system according to claim 4, wherein:
    said upper fork includes therein said hollow component parts, which are integrally joined to a bridge member of said upper fork.

* * * * *